US007155639B2

(12) United States Patent
Gorshenev et al.

(10) Patent No.: US 7,155,639 B2
(45) Date of Patent: Dec. 26, 2006

(54) COMPLIANCE TESTING COMMUNICATION PROTOCOLS IMPLEMENTED ON RESOURCE-CONSTRAINED COMPUTING DEVICES

(75) Inventors: Mikhail A. Gorshenev, Fremont, CA (US); Alexey V. Popov, St. Petersburg (RU); Vasily N. Isaenko, St. Petersburg (RU); Maxim N. Kurzenev, St. Petersburg (RU)

(73) Assignee: Sun Microsystems, Inc., Santa Clara, CA (US)

( * ) Notice: Subject to any disclaimer, the term of this patent is extended or adjusted under 35 U.S.C. 154(b) by 579 days.

(21) Appl. No.: 10/226,522

(22) Filed: Aug. 22, 2002

(65) Prior Publication Data
US 2004/0039965 A1   Feb. 26, 2004

(51) Int. Cl.
*G06F 11/00* (2006.01)

(52) U.S. Cl. .............................. 714/38; 714/4; 714/43; 709/220; 709/223; 717/124; 719/312; 719/313

(58) Field of Classification Search ................ 714/38, 714/47, 43; 717/124–129; 719/312–313
See application file for complete search history.

(56) References Cited

U.S. PATENT DOCUMENTS

| | | | | |
|---|---|---|---|---|
| 5,600,789 A | * | 2/1997 | Parker et al. ................ | 714/38 |
| 5,732,213 A | * | 3/1998 | Gessel et al. ............... | 709/224 |
| 5,854,889 A | * | 12/1998 | Liese et al. .................. | 714/43 |
| 6,125,382 A | * | 9/2000 | Brobst et al. ............... | 718/102 |
| 6,279,148 B1 | * | 8/2001 | Taivalsaari et al. ......... | 717/114 |
| 6,282,678 B1 | * | 8/2001 | Snay et al. .................. | 714/712 |
| 6,434,615 B1 | * | 8/2002 | Dinh et al. .................. | 709/224 |
| 6,571,274 B1 | * | 5/2003 | Jacobs et al. ............... | 709/203 |
| 6,604,209 B1 | * | 8/2003 | Grucci et al. ............... | 714/38 |
| 6,662,217 B1 | * | 12/2003 | Godfrey et al. ............. | 709/219 |
| 6,804,709 B1 | * | 10/2004 | Manjure et al. ............ | 709/220 |
| 2004/0153772 A1 | * | 8/2004 | Gorshenev et al. .......... | 714/25 |

OTHER PUBLICATIONS

"A Remote Access Servcie (RAS) Client CLass", Qing Zhang, Feb. 9, 1999.*

* cited by examiner

*Primary Examiner*—Robert W. Beausoliel
*Assistant Examiner*—Emerson Puente
(74) *Attorney, Agent, or Firm*—Park, Vaughan & Fleming, LLP

(57) ABSTRACT

One embodiment of the present invention provides a system that supports compatibility testing of functionality provided through an Application Programming Interface (API) on a computing device. During operation, the system loads a client testing module on the computing device. The system also loads a remote testing module on a server. Once the client testing module and the remote testing module have been loaded, the system identifies a communication protocol that is available between the computing device and the server, and configures a communication-protocol-specific portion of the client testing module to communicate with the remote testing module through the available communication protocol. The system then compatibility tests the functionality provided through the API on the computing device. During this compatibility testing, certain portions of the test execute within the client testing module while other portions of the test execute within the remote testing module. Hence, the client testing module and the remote testing module work together in a distributed manner to compatibility test the computing device.

25 Claims, 2 Drawing Sheets

COMPLIANCE TESTING COMMUNICATION PROTOCOLS IMPLEMENTED ON RESOURCE-CONSTRAINED COMPUTING DEVICES

BACKGROUND

1. Field of the Invention

The present invention relates to techniques for testing computing devices. More specifically, the present invention relates to a method and apparatus for compliance testing communication protocols supported on resource-constrained computing devices.

2. Related Art

The explosive growth of the Internet has fueled the demand for Internet-connected devices such as PDAs and cell phones. Initially, these devices were simple; they could send and receive simple text messages, as well as browse special text-only web sites. Over the years, these devices have become much more complex and are able to perform tasks that once required a much larger desktop computer. Many of these devices on the market today support numerous protocols and have built-in platform-independent virtual machines which allow them to run numerous platform-independent applications.

As these devices become more complex and support an ever increasing number of protocols, compliance testing becomes increasingly more important to ensure that the protocols supported by the device adhere to standardized protocol specifications. Note that applications that perform compliance testing need to be sufficiently large to test the functionality implemented on the device. Unfortunately, these devices typically provide only limited computing resources for running such compliance testing applications. Cell phones, for example, typically have small screens, small amounts of memory, limited processor power, and in many cases, limited communication bandwidth. More often than not, the resources available on the computing device are insufficient to perform a complete compliance test.

What is needed is a method and an apparatus for compliance testing computing devices without the problems mentioned above.

SUMMARY

One embodiment of the present invention provides a system that supports compatibility testing of functionality provided through an Application Programming Interface (API) on a computing device. During operation, the system loads a client testing module on the computing device. The system also loads a remote testing module on a server. Once the client testing module and the remote testing module have been loaded, the system identifies a communication protocol that is available between the computing device and the server, and configures a communication-protocol-specific portion of the client testing module to communicate with the remote testing module through the available communication protocol. The system then compatibility tests the functionality provided through the API on the computing device. During this compatibility testing, certain portions of the test execute within the client testing module while other portions of the test execute within the remote testing module. Hence, the client testing module and the remote testing module work together in a distributed manner to compatibility test the computing device.

In a variation on this embodiment, as the tests are completed, the system exchanges information between the client testing module and the remote testing module and assembles the results of the tests.

In a variation on this embodiment, the system configures a communication-protocol-specific portion of the remote testing module to communicate with the client testing module through the available communication protocol.

In a variation on this embodiment, the client testing module is run within a platform-independent virtual machine within the computing device.

In a variation on this embodiment, the remote testing module is run within a platform-independent virtual machine within the server.

In a variation on this embodiment, the compatibility testing is initiated at the server.

In a variation on this embodiment, the compatibility testing is initiated at the computing device.

In a variation on this embodiment, the results of the compatibility tests are sent to the server and are displayed on the server.

In a variation on this embodiment, the results of the compatibility tests are displayed on the computing device.

In a variation on this embodiment, the computing device receives one or more tests from the server during the compatibility testing process.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Network

Figure 1:
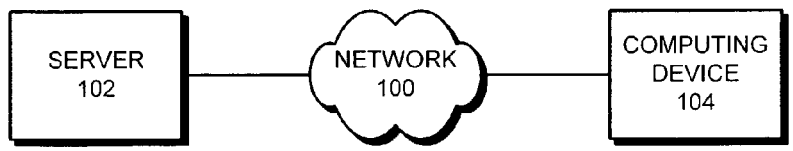
FIG. 1 illustrates a server coupled to a computing device through a computer network in accordance with an embodiment of the present invention.

FIG. 1 illustrates a server 102 coupled to a computing device 104 through computer network 100 in accordance with an embodiment of the present invention. Network 100 can generally include any type of wire or wireless communication channel capable of coupling together computing nodes. This includes, but is not limited to, a local area network, a wide area network, or a combination of networks. In one embodiment of the present invention, network 100 includes the Internet. Server 102 and computing device 104 can generally include any type of computer system, including, but not limited to, a computer system based on a microprocessor, a digital signal processor, a portable computing device, a personal organizer, a device controller, a cell phone, and a computational engine within an appliance.

Compliance Testing a Computing Device

Figure 2:
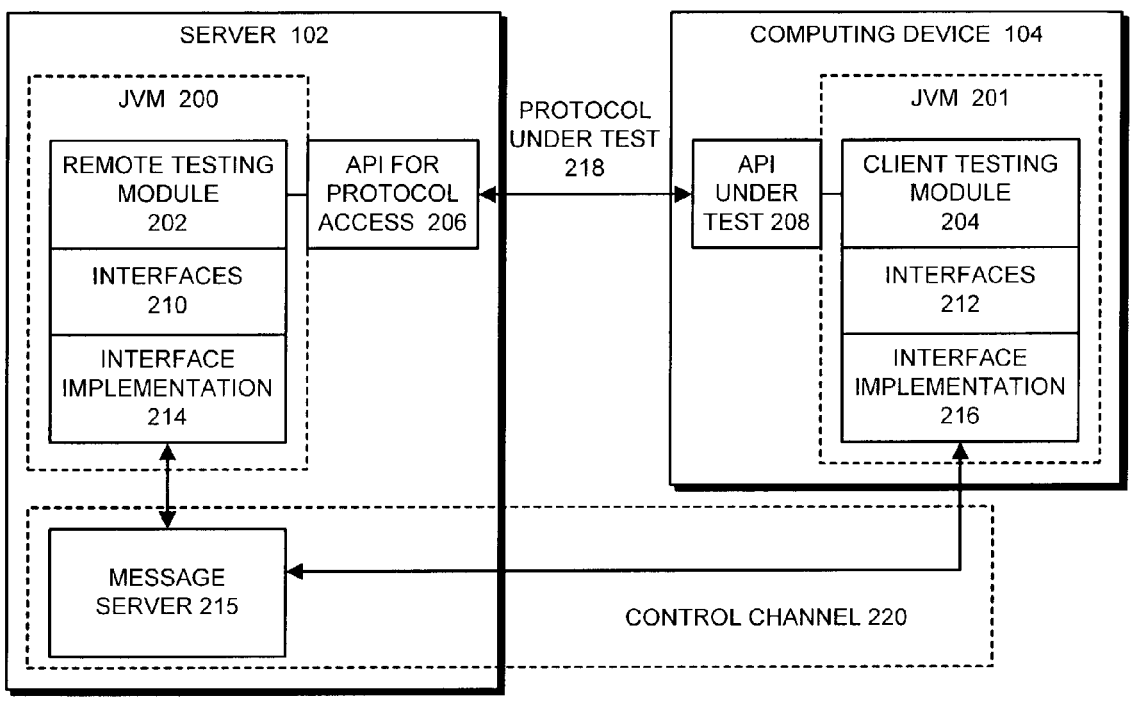
FIG. 2 illustrates mechanisms involved in compliance testing a computing device in accordance with an embodiment of the present invention.

FIG. 2 illustrates mechanisms involved in compliance testing computing device 104 in accordance with an embodiment of the present invention. As is illustrated in FIG. 2, server 102 contains JAVA VIRTUAL MACHINE (JVM) 200 and API for protocol access 206. The terms JAVA, JVM and JAVA VIRTUAL MACHINE are trademarks of SUN Microsystems, Inc. of Santa Clara, Calif. JVM 200 contains remote testing module 202, interfaces 210 and interface implementation 214. Computing device 104 contains JVM 201 and API under test 208. JVM 201 contains client testing module 204, interfaces 212 and interface implementation 216.

API for protocol access 206 is coupled to API under test 208 via protocol under test 218. Additionally, interface implementation 214 is coupled to interface implementation 216 via control channel 220. Control channel 220 includes message server 215, which abstracts the implementation of control channel 220, which makes it easier to facilitate message exchanges through control channel 220 using any reliable communication channel.

In one embodiment of the present invention, API for protocol access 206 is implemented as a "plugin" on server 102. This allows the underlying transport mechanism of the protocol under test 218 to be abstracted.

During operation, remote testing module 202 communicates with client testing module 204 via control channel 220. This allows remote testing module 202 to work with client testing module 204 in a distributed fashion, wherein remote testing module 202 executes portions of a test and sends commands to client testing module 204 to perform specified operations on computing device 104. In one embodiment of the present invention, most of the processing is performed within remote testing module 202, which sends requests through control channel 220 to client testing module 204. In another embodiment, most of the processing is performed within client testing module 204, which sends requests through control channel 220 to remote testing module 202.

In one embodiment of the present invention, control channel 220 is implemented using the "http" protocol, which is commonly supported on resource-constrained computing devices.

Interfaces 210 contains simple methods that allow the exchange of information between server 102 and computing device 104. In one embodiment of the present invention, interfaces 210 contains a "send" method, which has a message argument and an argument that specifies a test or a set of instructions to send, and a "receive" method which has no arguments. The send method allows server 102 to send a test or an instruction to computing device 104 along with a message. The receive method allows server 102 to receive a message and/or a component from computing device 104. Note that the corresponding send and receive methods are also present in interfaces 212 on computing device 104.

Process of Compliance Testing a Computing Device

Figure 3:
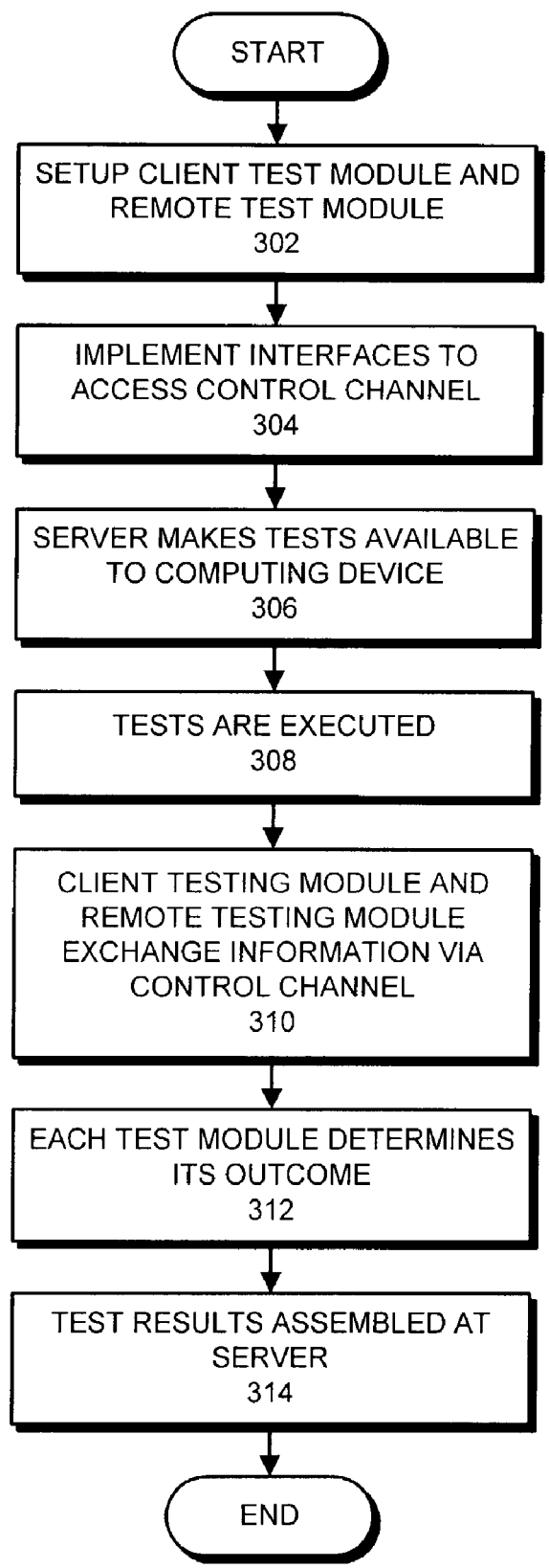
FIG. 3 presents a flowchart illustrating the process of compliance testing a computing device in accordance with an embodiment of the present invention.

FIG. 3 presents a flowchart illustrating the process of compliance testing computing device 104 in accordance with an embodiment of the present invention. The system starts by installing client test module 204 within computing device 104 and remote test module 202 in server 102 (step 302). In one embodiment of the present invention, client testing module 204 is loaded within JVM 201. Likewise, remote testing module is loaded within JVM 200. Once the modules have been installed and loaded, a communication link is established between client test module 204 and remote test module 202. This can be achieved by implementing interfaces to access control channel 220 (step 304).

Note that tests can be loaded into the modules in a number of ways. In one embodiment of the present invention, a test is loaded onto computing device 104 via a storage medium such as a flash card. In another embodiment, server 102 makes tests available to computing device 104 (step 306) via control channel 220. Once a communication link via control channel 220 has been established, the tests are executed on both remote testing module 202 and client testing module 204 (step 308). In one embodiment of the present invention, tests are run on remote testing module 202 and client testing module 204 in a distributed manner where remote testing module 202 sends commands to client testing module 204.

During testing, remote testing module 202 and client testing module 204 exchange information via control channel 220 as necessary (step 310), and each module determines its outcome independently (step 312). Once testing is complete, server 102 assembles the results of the testing (step 314). Optionally, the results can be displayed on computing device 104, saved to storage medium, or sent to a third party.

Compliance testing can encompass any functionality provided by computing device 104. In the example shown in FIG. 2, API under test 208 can be tested to verify that it adheres to protocol under test 218. This can be accomplished by sending test messages between computing device 104 and server 102 through API under test 208. At the same time client testing module 204 and remote testing module 202 continue to communicate with each other through control channel 220 because API under test 208 yet guaranteed to be operating properly.

Note that this distributed approach to testing facilitates a more complete testing of the communication process because test messages can be sent both from computing device 104 to server 102, and from server 102 to computing device 104 through protocol under test 218. During this testing process, the implementation of the communication protocol on computing device 104 can be tested against a stable implementation of the communication protocol on server 102.

Note that client testing module 204 and remote testing module 202 can also be used to verify that JVM 201 on computing device 104 adheres to the JAVA VIRTUAL MACHINE standard.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for compatibility testing functionality provided through an Application Programming Interface (API) on a computing device, comprising:

loading a client testing module on the computing device, wherein the client testing module is run within a platform-independent virtual machine within the computing device;

loading a remote testing module on a server, wherein the remote testing module is run within a platform-independent virtual machine within the server;

identifying a communication protocol that is available between the computing device and the server;

configuring a communication-protocol-specific portion of the client testing module to communicate with the remote testing module through the available communication protocol; and compatibility testing the functionality provided through the API on the computing device, wherein the client testing module and the remote testing module work together to compatibility test the functionality provided through the API by:

executing a portion of a test of the communication protocol provided through the API under test at the remote testing module; and sending commands via a control channel, which is separate from the communication protocol under test, from the remote testing module to the client testing module to perform operations on the computing device.

2. The method of claim 1, wherein compatibility testing the functionality provided through the API on the computing device further involves:

performing compatibility testing operations within the client testing module;

performing associated compatibility testing operations within the remote testing module;

exchanging information between the client testing module and the remote testing module; and assembling the results of the compatibility testing operations and the associated compatibility testing operations.

3. The method of claim 1, further comprising configuring a communication-protocol-specific portion of the remote testing module to communicate with the client testing module through the available communication protocol.

4. The method of claim 1, further comprising initiating the compatibility testing from the server.

5. The method of claim 1, further comprising initiating the compatibility testing from the computing device.

6. The method of claim 1, further comprising sending results of the compatibility testing from the computing device to the server; and displaying the results on the server.

7. The method of claim 1, further comprising displaying results of the compatibility testing on the computing device.

8. The method of claim 1, further comprising receiving one or more tests at the computing device from the server during compatibility testing.

9. A computer-readable storage medium storing instructions that when executed by a computer cause the computer to perform a method for compatibility testing functionality provided through an Application Programming Interface (API) on a computing device, the method comprising:

loading a client testing module on the computing device, wherein the client testing module is run within a platform-independent virtual machine within the computing device;

loading a remote testing module on a server, wherein the remote testing module is run within a platform-independent virtual machine within the server;

identifying a communication protocol that is available between the computing device and the server;

configuring a communication-protocol-specific portion of the client testing module to communicate with the remote testing module through the available communication protocol; and compatibility testing the functionality provided through the API on the computing device, wherein the client testing module and the remote testing module work together to compatibility test the functionality provided through the API by:

executing a portion of a test of the communication protocol provided through the API under test at the remote testing module; and sending commands via a control channel, which is separate from the communication protocol under test, from the remote testing module to the client testing module to perform operations on the computing device.

10. The computer-readable storage medium of claim 9, wherein compatibility testing the functionality provided through the API on the computing device further involves:

performing compatibility testing operations within the client testing module;

performing associated compatibility testing operations within the remote testing module;

exchanging information between the client testing module and the remote testing module; and assembling the results of the compatibility testing operations and the associated compatibility testing operations.

11. The computer-readable storage medium of claim 9, wherein the method further comprises configuring a communication-protocol-specific portion of the remote testing module to communicate with the client testing module through the available communication protocol.

12. The computer-readable storage medium of claim 9, wherein the method further comprises initiating the compatibility testing from the server.

13. The computer-readable storage medium of claim 9, wherein the method further comprises initiating the compatibility testing from the computing device.

14. The computer-readable storage medium of claim 9, wherein the method further comprises sending results of the compatibility testing from the computing device to the server; and displaying the results on the server.

15. The computer-readable storage medium of claim 9, wherein the method further comprises displaying results of the compatibility testing on the computing device.

16. The computer-readable storage medium of claim 9, wherein the method further comprises receiving one or more tests at the computing device from the server during compatibility testing.

17. An apparatus that compatibility tests functionality provided through an Application Programming Interface (API) on a computing device, comprising:

a client testing mechanism configured to load a client testing module on the computing device, wherein the client testing module is run within a platform-independent virtual machine within the computing device;

a remote testing mechanism configured to load a remote testing module on a server, wherein the remote testing module is run within a platform-independent virtual machine within the server;

a identification mechanism configured to identify a communication protocol that is available between the computing device and the server;

a communication mechanism structured to configure a communication-protocol-specific portion of the client testing module to communicate with the remote testing module through the available communication protocol;

a compatibility testing mechanism configured to compatibility test the functionality provided through the API on the computing device, wherein the client testing module and the remote testing module work together to compatibility test the functionality provided through the API;

an executing mechanism configured to execute a portion of a test of the communication protocol provided through the API under test at the remote testing module; and a sending mechanism configured to send commands via a control channel, which is separate from the communication protocol under test, from the remote testing module to the client testing module to perform operations on the computing device.

18. The apparatus of claim 17, wherein the compatibility testing mechanism is further configured to:

perform compatibility testing operations within the client testing module;

perform associated compatibility testing operations within the remote testing module;

exchange information between the client testing module and the remote testing module; and to assemble the results of the compatibility testing operations and the associated compatibility testing operations.

19. The apparatus of claim 17, further comprising a remote communications mechanism configured to configure a communication-protocol-specific portion of the remote testing module to communicate with the client testing module through the available communication protocol.

20. The apparatus of claim 17, further comprising an initiation mechanism configured to initiate the compatibility testing from the server.

21. The apparatus of claim 17, further comprising an initiation mechanism configured to initiate the compatibility testing from the computing device.

22. The apparatus of claim 17, further comprising:

a reporting mechanism configured to send results of the compatibility testing from the computing device to the server; and a display mechanism configured to display the results on the server.

23. The apparatus of claim 17, further comprising a display mechanism configured to display results of the compatibility testing on the computing device.

24. The apparatus of claim 17, further comprising a receiving mechanism configured to receive one or more tests at the computing device from the server during compatibility testing.

25. A means for compatibility testing functionality provided through an Application Programming Interface (API) on a computing device, comprising:

a loading means for loading a client testing module on the computing device, wherein the client testing module is run within a platform-independent virtual machine within the computing device;

a secondary loading means for loading a remote testing module on a server, wherein the remote testing module is run within a platform-independent virtual machine within the server;

an identification means for identifying a communication protocol that is available between the computing device and the server;

a communication means for configuring a communication-protocol-specific portion of the client testing module to communicate with the remote testing module through the available communication protocol;

a testing means for compatibility testing the functionality provided through the API on the computing device, wherein the client testing module and the remote testing module work together to compatibility test the functionality provided through the API an executing means for executing a portion of a test of the communication protocol provided through the API under test at the remote testing module; and a sending means for sending commands via a control channel, which is separate from the communication protocol under test, from the remote testing module to the client testing module to perform operations on the computing device.

* * * * *